US012382563B2

(12) United States Patent
Hsia

(10) Patent No.: US 12,382,563 B2
(45) Date of Patent: Aug. 5, 2025

(54) SOLID-STATE LIGHTING WITH IMPERCEPTIBLE FLICKER

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 153 days.

(21) Appl. No.: 18/370,841

(22) Filed: Sep. 20, 2023

(65) Prior Publication Data

US 2024/0015868 A1 Jan. 11, 2024

Related U.S. Application Data

(63) Continuation-in-part of application No. 17/857,807, filed on Jul. 5, 2022, now Pat. No. 11,930,571, which is a continuation-in-part of application No. 17/839,179, filed on Jun. 13, 2022, now Pat. No. 11,510,296, which is a continuation-in-part of application No. 17/735,002, filed on May 2, 2022, now Pat. No. 11,490,476, which is a continuation-in-part of application No. 17/717,838, filed on Apr. 11, 2022, now Pat. No. 11,846,396, which is a continuation-in-part of application No. 17/696,780, filed on Mar. 16, 2022, now Pat. No. 11,946,626, which is a continuation-in-part of application No. 17/405,203, filed on Aug. 18, 2021, now Pat. No. 11,283,291, which is a (Continued)

(51) Int. Cl.

| | |
|---|---|
| ***H05B 45/59*** | (2022.01) |
| ***H05B 45/24*** | (2020.01) |
| ***H05B 45/305*** | (2020.01) |
| ***H05B 45/31*** | (2020.01) |
| ***H05B 45/39*** | (2020.01) |
| *H05B 45/392* | (2020.01) |

(52) U.S. Cl.
CPC ............. *H05B 45/59* (2022.01); *H05B 45/24* (2020.01); *H05B 45/305* (2020.01); *H05B 45/31* (2020.01); *H05B 45/39* (2020.01); *H05B 45/392* (2020.01)

(58) Field of Classification Search
None
See application file for complete search history.

(56) References Cited

U.S. PATENT DOCUMENTS 9,131,581 B1 * 9/2015 Hsia ..................... H05B 45/375
2015/0373790 A1 * 12/2015 Boswinkel ............. H05B 47/19 315/186

(Continued)

*Primary Examiner* — Anh Q Tran
(74) *Attorney, Agent, or Firm* — Andy M. Han; Han IP PLLC

(57) ABSTRACT

A light-emitting diode (LED) luminaire comprising two types of LEDs, a switching circuit, a signal generating circuit, and an LED driving circuit is used to replace a conventional luminaire with a severe temporal light artifact. The switching circuit and the LED driving circuit are configured to reduce a low-frequency ripple associated with AC mains. The signal generating circuit is configured to produce two sets of modulation signals with a phase difference of 180 degrees between the two sets of modulation signals, which are then embedded in the LED driving current to drive the two types of LEDs, resulting in imperceptible flicker at a temporal modulation frequency as a result of color mixing of the two types of LEDs and persistence of vision, thereby drastically reducing eyestrain, visual discomfort, etc.

21 Claims, 12 Drawing Sheets

Related U.S. Application Data continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | | |
|---|---|---|---|---|
| 2016/0073469 A1* | 3/2016 | Fukuda | H05B 45/3725 | 315/294 |
| 2016/0381759 A1* | 12/2016 | Watanabe | H05B 45/375 | 315/297 |
| 2017/0027030 A1* | 1/2017 | Wang | H05B 45/20 | |

* cited by examiner

SOLID-STATE LIGHTING WITH IMPERCEPTIBLE FLICKER

CROSS-REFERENCE TO RELATED APPLICATIONS

The present disclosure is part of a continuation-in-part (CIP) application of U.S. patent application Ser. No. 17/857,807, filed 5 Jul. 2022, which is part of CIP application of U.S. patent application Ser. No. 17/502,029, filed 14 Oct. 2021 and issued as U.S. Pat. No. 11,330,688 on 10 May 2022, Contents of the above-identified applications are incorporated herein by reference in their entirety.

BACKGROUND

Technical Field

The present disclosure relates to light-emitting diode (LED) luminaires and more particularly to an LED luminaire that includes a signal generating circuit to modulate an LED driving circuit to promote benign light flicker artifacts which may possibly entrain gamma oscillations in a human's brain.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential health concerns such as temporal light artifacts become especially important and need to be well addressed.

In today's retrofit application of an LED luminaire to replace an existing fluorescent luminaire, consumers may choose either to adopt a ballast-compatible luminaire with an existing ballast used to operate the fluorescent luminaire or to employ an alternate current (AC) mains-operable LED luminaire by removing/bypassing the ballast. Either application has its advantages and disadvantages. In the former case, although the ballast consumes extra power, it is straightforward to replace the fluorescent luminaire without rewiring, which consumers have a first impression that it is the best alternative to the fluorescent luminaire. But the fact is that the total cost of ownership for this approach is high regardless of very low initial cost. For example, the ballast-compatible luminaire works only with particular types of ballasts. If an existing ballast is not compatible with the ballast-compatible luminaire, the consumer will have to replace the ballast. Some facilities built a long time ago incorporate different types of fixtures, which requires extensive labor for both identifying ballasts and replacing incompatible ones. Moreover, a ballast-compatible luminaire can operate longer than the ballast. When an old ballast fails, a new ballast will be needed to replace in order to keep the ballast-compatible luminaire working. Maintenance will be complicated, sometimes for the luminaires and sometimes for the ballasts. The incurred cost will preponderate over the initial cost savings by changeover to the ballast-compatible luminaire for hundreds of fixtures throughout a facility. When the ballast in a fixture dies, all the ballast-compatible luminaires in the fixture go out until the ballast is replaced. In addition, replacing a failed ballast requires a certified electrician. The labor costs and long-term maintenance costs will be unacceptable to end users. From an energy saving point of view, the ballast constantly draws power, even when the ballast-compatible luminaires are dead or not installed. In this sense, any energy saved while using the ballast-compatible luminaire becomes meaningless with the constant energy use by the ballast. In the long run, the ballast-compatible luminaires are more expensive and less efficient than self-sustaining AC mains-operable luminaires.

On the contrary, an AC mains-operable luminaire does not require the ballast to operate. Before use of the AC mains-operable luminaire, the ballast in a fixture must be removed or bypassed. Removing or bypassing the ballast does not require an electrician and can be replaced by end users. Each AC mains-operable luminaire is self-sustaining. If one AC mains-operable luminaire in a fixture goes out, other luminaires or lamps in the fixture are not affected. Once installed, the AC mains-operable luminaire will only need to be replaced after 50,000 hours.

According to CIE 17.443 e-ILV, the temporal light artifact (TLA) is an undesired change in visual perception induced by a light stimulus whose luminance or spectral distribution fluctuates with time. A flicker, one of TLA, is a perception of visual unsteadiness for a static observer in a static environment. Furthermore, according to IEEE 1789-2015, flickers are variations in luminance over time (i.e., temporal modulation of light). The health impacts of flicker in LED lighting to consumers have seldom been discussed. Occasionally, when some conventional luminaires or lamps fail resulting in flicker, concurrently introducing seizures in the small percentage of the population that suffers from photosensitive epilepsy. Magnetically ballasted fluorescent lamps or luminaires have flicker issues identified to be related to migraines, headaches, reduced visual performance and comfort, and other possible neurological health issues. When high frequency electronic ballasts become popular, the flicker issues of fluorescent lamps or luminaires diminish. However, a flicker component for such fluorescent lamps or luminaires is between 20% and 25%. For an incandescent lamp and a halogen lamp, the flicker frequency is 120 Hz, and the flicker component is between 15% up to 25%. Compact fluorescent lamps, as energy-saving lamps, have a flicker frequency in a range of 20 kHz to 150 kHz due to a built-in electronic power supply. The flicker component is between 20% and 40%. Since the brightness of LEDs responds instantaneously to an operating current, the flicker frequency and the flicker component depend on a driving current of a power supply used. The flicker component may be between 0% and 100%. The flicker frequency may be from 60 Hz to several hundred kHz, depending on a switching frequency of the power supply used to drive the LEDs. That is, for LED luminaires or lamps, the flicker is primarily determined by the power supply, and some possible health risks are associated with low-frequency modulation of the LEDs.

According to IEEE Recommended Practice (2015), regarding flicker, potential flicker-induced impairments include: 1) neurological problems, including epileptic seizure; 2) headaches, fatigue, blurred vision, eyestrain; 3) migraines; 4) reduced visual task performance; 5) increased autistic behaviors, especially in children; 6) apparent slowing or stopping of motion (stroboscopic effect); 7) distraction. In this case, an LED driving circuit in the power supply must be designed to modulate LED driving current at benign frequencies and to suppress any low-frequency flicker components associated with AC mains in the first place in order to help protect against the health risks.

Experimental results of exposure to 40 Hz stroboscopic light, for one hour a day, have previously been published to show that the 40 Hz stroboscopic light is a potential treatment option for Alzheimer's disease in animal models because exposure to such a stroboscopic light can entrain gamma oscillations in a subject's brain, thereby improving the brain's health. However, exposure for an hour a day to 40 Hz stroboscopic light can be strenuous to a human's vision. Alternative types of 40 Hz inducing stimuli with imperceptible flickers may be required if a long-term treatment is needed. In addition to 40 Hz stimuli, an imperceptible gamma-band sensory stimulation at a frequency of 65 Hz has been introduced to enhance episodic memory retrieval according to a study in England and Germany. Furthermore, a US patent publication (publication #: US 2020-0269065) discloses a method of treating depression, short-term memory loss, of improving cognition, of improving sleep, etc. using a blinking blue light at a frequency ranging from about 20 Hz up to about 60 Hz. However, when such a blue light source is disposed in a common lamp or a luminaire, a side-effect concern arises because constant exposure to the blue light source over time could damage retinal cells and cause vision problems such as age-related macular degeneration. It can also contribute to cataracts, eye cancer, and growths on the clear covering over the white part of the eye. It is, therefore, a luminaire manufacturer's responsibility to design and to develop the luminaire friendly to consumers without eye discomfort associated with perceptible light flickers and potential risks of damaging to eyes. It is also essential that a luminaire in general lighting applications must meet a requirement of color rendering index (Ra), which is Ra≥80 and $R_9>0$. $R_9$ is calculated, along with its corresponding test color sample (TCS9), as a common recommendation to know about a light source's color quality. The luminaire shall be capable of providing at least one of the nominal correlated color temperatures (CCTs): 2700 K, 3000 K, 3500 K, 4000 K, and 5000 K. The luminaire chromaticity shall also fall within the corresponding 7-step chromaticity quadrangles as defined in ANSI/NEMA/ANSLG C78.377-2011. It will be demonstrated that a novel technology based on controlling two white LEDs at different CCTs to produce a white light at a third CCT where the two white LEDs alternates at a given temporal modulation frequency without perceptible flicker while still entraining gamma oscillations in different cortical and subcortical structures of the human's brain. In various studies, it has been shown that a steady state visual evoked potential (SSVEP), widely used within the field of Brain Computer Interface (BCI), appears even when the stimulation at a given flicker frequency is perceived as imperceptible by an observer. Instead of doing a temporal modulation between light being on and off (i.e., a 100% modulation depth), the imperceptible flicker can be made by using temporal modulation between the two white LEDs with different spectral power distributions.

SUMMARY

An LED luminaire comprising one or more LED arrays, at least one full-wave rectifier, a switching circuit, a signal generating circuit, and an LED driving circuit is used to replace a conventional luminaire with severe light flickering. The at least one full-wave rectifier is coupled to alternate-current (AC) mains and configured to convert a line voltage from the AC mains into a first direct-current (DC) voltage. The switching circuit comprises a control device, a diode rectifier circuit, and a first electronic switch controlled by the control device and is configured to modulate the first DC voltage into a variable DC voltage at a switching frequency. The signal generating circuit comprises a phase shifter circuit and is configured to produce a first set of signal and a second set of signal both at a predetermined temporal modulation frequency. The LED driving circuit comprises two sets of drivers and is configured to produce two sets of driving current in response to the first set of signal and the second set of signal to drive the one or more LED arrays. The phase shifter circuit is configured to shift a first phase of the first set of signal into a second phase of the second set of signal. The switching circuit is configured to convert the first DC voltage into a second DC voltage and to operate the two sets of drivers. The two sets of drivers are further configured to respectively produce a third DC voltage and a fourth DC voltage each with a lower electric potential than the second DC voltage. The two sets of drivers respectively comprise a second electronic switch and a third electronic switch respectively configured to modulate the two sets of driving current in response to the first set of signal and the second set of signal to drive the one or more LED arrays.

The one or more LED arrays comprise a first type of LEDs and a second type of LEDs. Either of the first set of signal and the second set of signal comprises a modulation signal at the predetermined temporal modulation frequency with a phase difference angle of nominal 180 degrees between the first phase and the second phase. The third DC voltage, the fourth DC voltage, and the two sets of driving current in response to the first set of signal and the second set of signal are further configured to respectively drive the first type of LEDs and the second type of LEDs. Each of the two sets of drivers further comprises a low-pass filter circuit configured to remove high frequency components higher than the predetermined temporal modulation frequency in either of the third DC voltage or the fourth DC voltage, resulting in an illumination from the first type of LEDs and the second type of LEDs with less visual discomfort to luminaire users, which may reduce human biological effects. The diode rectifier circuit provides a primary output port whereas the low-pass filter circuit in either of the two sets of drivers provides a secondary output port. The third DC voltage and the fourth DC voltage are respectively taken between the primary output port and the secondary output port in each of the two sets of drivers, thereby canceling out a common fluctuating AC component in the third DC voltage and the fourth DC voltage. The third DC voltage and the fourth DC voltage that have almost the same voltage are respectively applied to the first type of LEDs and the second type of LEDs with reduced flickers, thereby reducing eye-strain of the luminaire users.

Each of the first set of signal and the second set of signal may comprise square waves comprising a series of pulses with a duty cycle of 50% and a predetermined period, whereas the two sets of driving current comprise two modulation signals both associated with the predetermined period. Respective light emissions from the first type of LEDs and the second type of LEDs in response to the two sets of driving current comprise the predetermined period with a phase difference angle of nominal 180 degrees, same as the phase difference angle between the two modulation signals respectively applied on the first type of LEDs and the second type of LEDs. Overall light emissions in combination from the first type of LEDs and the second type of LEDs comprise a reduced percent flicker due to the two modulation signals that are complementary.

For a first example of two types of LEDs, the first type of LEDs and the second type of LEDs respectively comprise a first white light at a nominal CCT of 3500 K and a second white light at a nominal CCT of 5000 K. For a second example of two types of LEDs, the first type of LEDs and the second type of LEDs respectively comprise a first white light at a nominal CCT of 3000 K and a second white light at a nominal CCT of 6500 K. For a third example of two types of LEDs, the first type of LEDs and the second type of LEDs respectively comprise a first white light at a nominal CCT of 2700 K and a second white light at a nominal CCT of 6500 K. Resultant illuminations from the first example to the third example all exhibit a nominal CCT of 4000 K as a result of color mixing along a Planckian locus in color coordinates. For a fourth example of two types of LEDs, the first type of LEDs comprise multiple LEDs saturated at red, saturated at green, and saturated at blue, whereas the second type of LEDs comprise a white light at a nominal CCT of 4000 K. A resultant illumination from the first type of LEDs exhibits a nominal CCT of 4000 K as a result of color mixing for the multiple LEDs along a Planckian locus in color coordinates. The predetermined temporal modulation frequency may be a nominal 40 Hz, which is lower than critical flicker frequency (CFF) and is perceptible by most people. The temporal modulation frequency at which flicker disappears is referred to as the flicker threshold or, more commonly, the CFF, which is 48 Hz for brightness flicker. The brightness flicker occurs when the two modulation signals are in phase. The phenomenon of disappearance of flicker at that frequency is called flicker fusion. Although two complementary modulation signals are used to suppress light flickers from the first type of LEDs and the second type of LEDs, a tiny flicker may be detected by customers who have acute visions. To satisfy those customers, the LED luminaire must include an option to further improve flicker imperceptibility. In that case, the one or more LED arrays may further comprise a third type of LEDs whereas the first set of signal and the second set of signal are configured to modulate the two sets of driving current to drive the first type of LEDs and the second type of LEDs. The third type of LEDs are configured to be driven with a constant current, thereby increasing a background light in an illumination area, consequently decreasing a possibility of light flickers on the first type of LEDs and the second type of LEDs to be detected with a reduced percent flicker. The LED driving circuit may comprise only one driver configured to produce one set of driving current in response to the modulation signal to drive the one or more LED arrays. In this case, the predetermined temporal modulation frequency may be a nominal 65 Hz, which is higher than CFF and is imperceptible by most people. However, to satisfy customers who have acute visions to see a tiny flicker, the LED luminaire must include an option to further improve flicker imperceptibility. In this case, the one or more LED arrays may comprise a first portion of LEDs and a second portion of LEDs whereas the modulation signal is configured to modulate the only one set of driving current to drive the first portion of LEDs. The second portion of LEDs are configured to be driven with a constant current, thereby increasing a background light in an illumination area, consequently decreasing a possibility of light flickers on the first portion of LEDs to be detected with a reduced percent flicker.

BRIEF DESCRIPTION OF THE DRAWINGS

Non-limiting and non-exhaustive embodiments of the present disclosure are described with reference to the following figures, wherein like names refer to like parts but their reference numerals differ throughout the various figures unless otherwise specified. Moreover, in the section of detailed description of the invention, any of a "primary", a "secondary", a "first", a "second", a "third", and so forth does not necessarily represent a part that is mentioned in an ordinal manner, but a particular one.

DETAILED DESCRIPTION OF VARIOUS EMBODIMENTS

Figure 1:
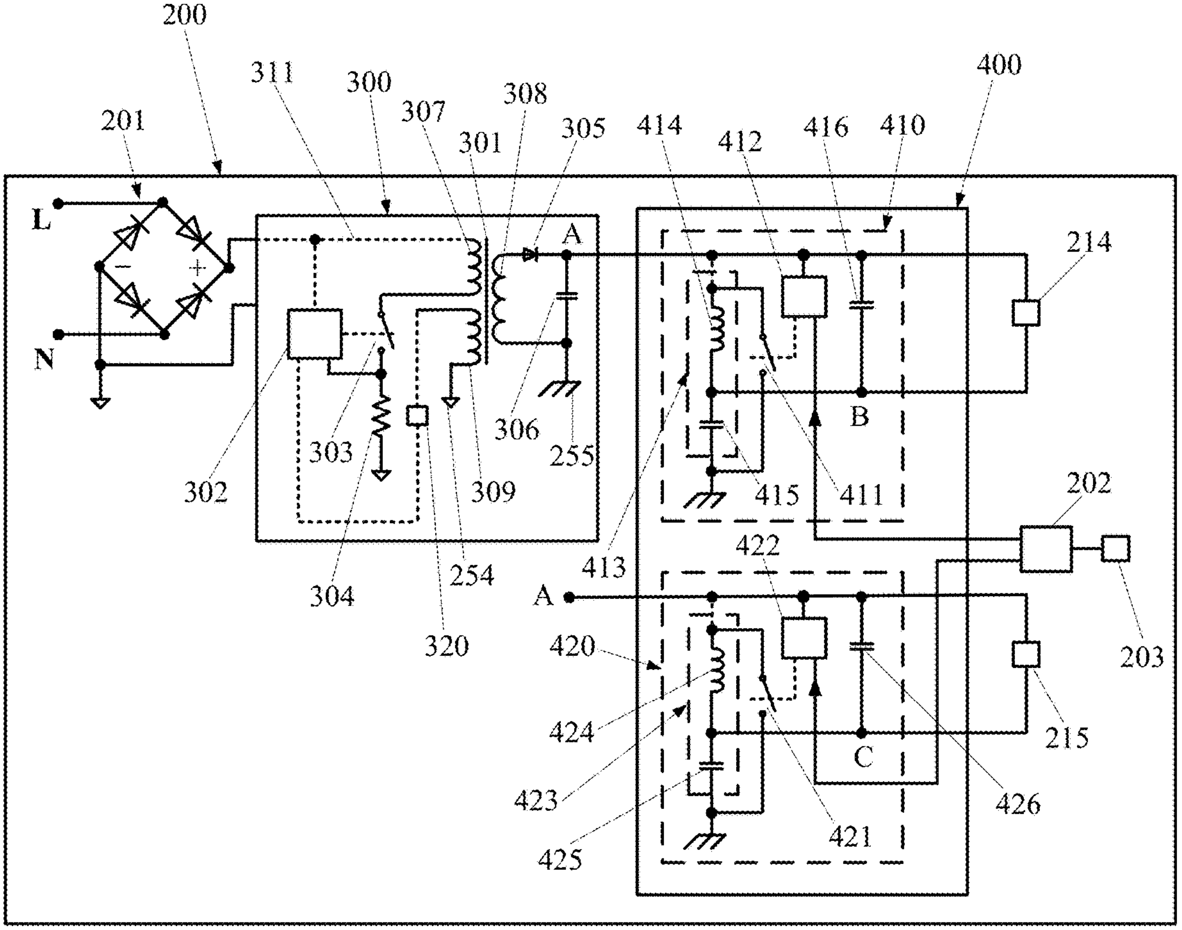
FIG. 1 is a first embodiment of an LED luminaire according to the present disclosure.

FIG. 1 is a first embodiment of an LED luminaire according to the present disclosure. In FIG. 1, the LED luminaire 200 comprises one or more LED arrays 214 and 215, a switching circuit 300, and an LED driving circuit 400. The LED luminaire 200 further comprises at least two electrical conductors "L'" and "N", at least one full-wave rectifier 201, a signal generating circuit 202, and at least one quartz crystal circuit 203. The at least two electrical conductors "L'" and "N" are configured to couple to a line voltage from the AC mains. The at least one full-wave rectifier 201 is configured to convert the line voltage into a first DC voltage. The signal generating circuit 202 is configured to produce a first set of signal and a second set of signal both at a predetermined temporal modulation frequency. The at least one quartz crystal circuit 203 is configured to generate an oscillation frequency.

The switching circuit 300 comprises a transformer 301, a first control device 302, a first ground reference 254, a first electronic switch 303 controlled by the first control device 302, a current control resistor 304, and a diode rectifier circuit 305. The first electronic switch 303 is configured to modulate the first DC voltage into a variable DC voltage at a switching frequency. The transformer 301 comprises a primary winding 307, a secondary winding 308, and an auxiliary winding 309. When the first electronic switch 303 is closed, an input current flows into the primary winding 307 with energy stored in its increasing magnetic field, and the diode rectifier circuit 305 is reverse biased. When the first electronic switch 303 is opened, the diode rectifier circuit 305 conducts to generate energy pulses that can be transmitted via the secondary winding 308. That is to say that the diode rectifier circuit 305 is configured to provide energy pulses when the first electronic switch 303 is turned off. The first electronic switch 303 is a key of the switching circuit 300 to provide the variable DC voltage, ultimately regulating an output voltage and current.

In FIG. 1, the switching circuit 300 is coupled to the at least one full-wave rectifier 201 and configured to convert the first DC voltage into the variable DC voltage at the switching frequency, ultimately being rectified and filtered into a second DC voltage by the diode rectifier circuit 305 and a capacitor 306. The second DC voltage appears at a port "A". In FIG. 1, the switching circuit 300 further comprises a high voltage port 311 coupled to the primary winding 307, and a voltage feedback circuit 320 coupled to the auxiliary winding 309. The high voltage port 311 is configured to provide a startup voltage to operate the first control device 302. When the primary winding 307 is operating, the voltage feedback circuit 320 receives a power from the auxiliary winding 309 with an auxiliary voltage to sustain an operation of the first control device 302. The voltage feedback circuit 320 may comprise a diode. When the startup voltage decreases due to its increased internal operations and controls, and when the auxiliary voltage is higher than the startup voltage, the diode in the voltage feedback circuit 320 conducts to supply a current to sustain operations of the first control device 302. The function of the voltage feedback circuit 320 is essential for the first control device 302 to operate properly because the switching circuit 300 has a wide range of operating voltages, for example, 110, 277, or 347 VAC from the AC mains in North America and because the line voltage from the AC mains goes to zero in each AC cycle. The voltage feedback circuit 320 is thus needed to pump in energy in time and to sustain the operating voltage and to ensure no strobing occurred when the one or more LED arrays 214 and 215 are operating. That is, the voltage feedback circuit 320 is configured to draw energy from the auxiliary voltage to sustain operation of the first control device 302.

In FIG. 1, the LED driving circuit 400 comprises a second ground reference 255 electrically isolated from the first ground reference 254 using the transformer 301, and two sets of drivers 410 and 420 configured to produce two sets of driving current in response to the first set of signal and the second set of signal to drive the one or more LED arrays 214 and 215. Each of the two sets of drivers 410 and 420 respectively comprises a second electronic switch 411 and a third electronic switch 421 respectively configured to modulate the two sets of driving current in response to the first set of signal and the second set of signal to respectively drive the one or more LED arrays 214 and 215.

In FIG. 1, each of the two sets of drivers 410 and 420 further respectively comprises a second control device 412 and a third control device 422. Each of the two sets of drivers 410 and 420 further respectively comprises a first low-pass filter 413 and a second low-pass filter 423 both coupled to the diode rectifier circuit 305 and configured to remove high frequency components higher than the predetermined temporal modulation frequency in either of the third DC voltage or the fourth DC voltage, thereby with a resulting illumination from the one or more LED arrays 214 and 215 free of the high frequency components, which may reduce human biological effects. The high frequency components may come from a modulation via the signal generating circuit 202. Each of the first low-pass filter 413 and the second low-pass filter 423 respectively comprises an inductor 414 and 424 and a capacitor 415 and 425. And an output port "B" of the first low-pass filter 413 is taken between the inductor 414 and the capacitor 415. Similarly, an output port "C" of the second low-pass filter 423 is taken between the inductor 424 and the capacitor 425. The second DC voltage, which is with respect to the second ground reference 255, comprises a low-frequency variation (i.e., a ripple) associated with the AC mains because the line voltage is sinusoidal at a nominal frequency of 50 Hz or 60 Hz. The DC voltages at the port "B" and the port "C" comprise the same low-frequency variation. The third DC voltage is taken between the port "A" and "B" and filtered by a capacitor 416, whereas the fourth DC voltage is taken between the port "A" and "C" and filtered by a capacitor 426. The same variations are compensated, leading to the third DC voltage and the fourth DC voltage free of the low-frequency variation with a reduced low-frequency current ripple to drive the one or more LED arrays 214 and 215 with a flicker-reduced light emission. That is, by taking an electric potential difference between the second DC voltage and the output of the low-pass filter as the third DC voltage, the low-frequency ripple is suppressed to produce the third DC voltage with the ripple-reduced LED driving current, so does the fourth DC voltage. In other words, the LED driving circuit 400 can provide one or more sets of output current required to operate the one or more LED arrays 214 and 215 with a luminous flux that has a suppressed flicker. Please note that the low-frequency flicker, referred to a nominal flicker frequency of 100 Hz or 120 Hz, depending on a line frequency of the AC mains used, may cause eyestrain to luminaire users. The suppressed flicker may release such eye discomfort.

In FIG. 1, the signal generating circuit 202 is coupled to the at least one quartz crystal circuit 203 and configured to generate the first set of signal and the second set of signal both at a predetermined temporal modulation frequency. When both the first set of signal and the second set of signal are modulated at the predetermined temporal modulation frequency, a first modulated signal goes to the first set of driver 410 whereas a second modulated signal goes to the second set of driver 420. The first modulated signal and the second modulated signal, which are 180 degrees out of phase, are respectively sent to the second control device 412 and the third control device 422 to control the second electronic switch 411 and the third electronic switch 421 to turn on and off so as to modulate the first modulated signal and the second modulated signal into the third DC voltage and the fourth DC voltage, which are used to drive the one or more LED arrays 214 and 215. In other words, the first modulated signal and the second modulated signal respectively has a first phase and a second phase. A phase difference angle between the first phase and the second phase is 180 degrees. Specifically, the first modulated signal and the second modulated signal may be referred to as two complementary modulation signals.

In FIG. 1, the one or more LED arrays 214 and 215 respectively comprise a first type of LEDs and a second type of LEDs, which have different spectral power distributions (SPD) from each other. As will be depicted below, the one or more LED arrays 214 and 215 respectively emit a first set of emission and a second set of emission each comprising individual flickers according to the first modulated signal and the second modulated signal. But a mixture of the first set of emission and the second set of emission exhibits an imperceptible flicker with the temporal modulation frequency at a benign frequency which has potential effects to entrain gamma oscillations in luminaire users' brains, thereby improving brain functions. As mentioned, the mixture of the first set of emission and the second set of emission exhibits a different color coordinate or correlated color temperature (CCT) as a result of color mixing between the first set of emission and the second set of emission.

Each of the first modulated signal and the second modulated signal may exhibit like a series of binary data. To obtain a best signal-to-noise ratio, it may be necessary to modulate the signals onto a carrier wave with a fixed carrier frequency. Binary symbol "1" is represented by transmitting a sinusoidal carrier wave of fixed amplitude and the fixed frequency for "on" duration, whereas binary symbol "0" is represented by switching off the carrier for "off" duration. A modulation process corresponds to switching the amplitude. Such a signaling technique is similar to amplitude-shift keying (ASK). At a receiving end of either the first set of driver 410 or the second set of driver 420, the carrier waves must be removed before going into the two sets of LED driving current. This is where the first low-pass filter 413 and the second low-pass filter 423 come in to remove the high frequency components of the carrier waves. The signal generating circuit 202 may comprise a Bluetooth system-on-chip (SOC) circuit configured to send such an ASK signal.

Figure 2:
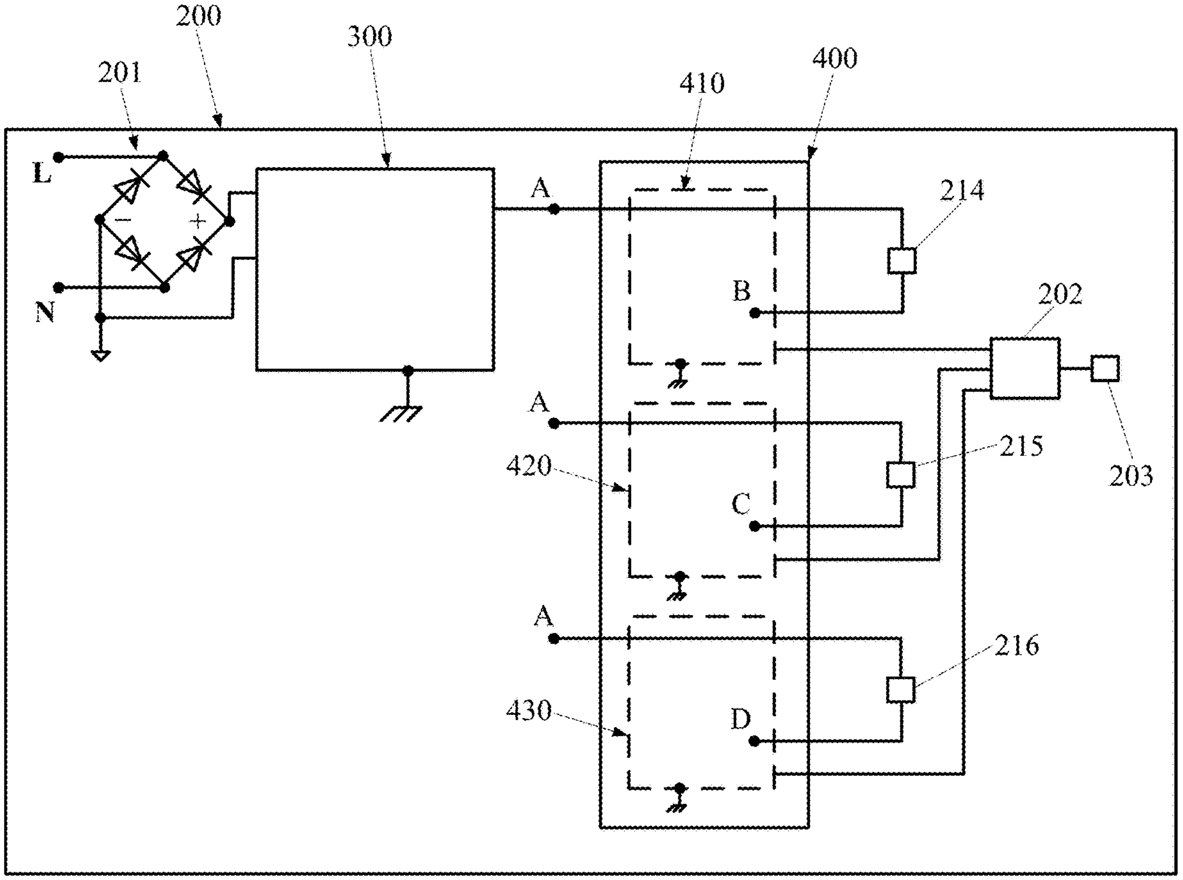
FIG. 2 is a second embodiment of an LED luminaire according to the present disclosure.

FIG. 2 is a second embodiment of an LED luminaire according to the present disclosure. In FIG. 1, the LED driving circuit 400 comprises the two sets of drivers, 410 and 420, configured to produce two sets of driving current in response to the first set of signal and the second set of signal to drive the one or more LED arrays 214 and 215. As mentioned above, when a phase shift of a nominal 180 degrees is introduced between the first set of signal and the second set of signal, the mixture of light emissions from the one or more LED arrays 214 and 215 exhibits an imperceptible flicker. However, the imperceptible flicker sometimes cannot satisfy customers who have acute visions to see a tiny flicker. In that case, the LED luminaire must include an option to further improve flicker imperceptibility. In FIG. 2, the LED driving circuit 400 further comprises one or more LED arrays 216 in addition to the one or more LED arrays 214 and 215 and a third set of driver 430 in addition to the two sets of drivers 410 and 420. The third set of driver 430 is configured to produce a third set of driving current without a modulated signal to drive the one or more LED arrays 216. In this case, the signal generating circuit 202 may send the binary symbol "0" all the way to the third set of driver 430, switching off the carrier. In other words, the one or more LED arrays 216 are driven with a constant current. No matter whether the first modulated signal and the second modulated signal are present or not, the mixture of the first set of emission and the second set of emission exhibits a different color coordinate or CCT from the first set of emission and the second set of emission, so called color fusion. Simply put, the one or more LED arrays 216 comprise a third type of LEDs of which light emissions exhibit a color-fusion color. The light emissions at the color-fusion color from the one or more LED arrays 216 is used to increase a background light in an illumination area, which consequently decreases a possibility of a light flicker on the first type of LEDs and the second type of LEDs due to the first modulated signal and the second modulated signal to be detected with a reduced percent flicker. In FIG. 2, the one or more LED arrays 215 can be removed if there is no need to modulate the second set of LED driving current to reduce apparent flickers (to be depicted in FIG. 3). In that case, a temporal modulation frequency may be above CFF, and such a flicker cannot be perceived by most people.

Figure 3:
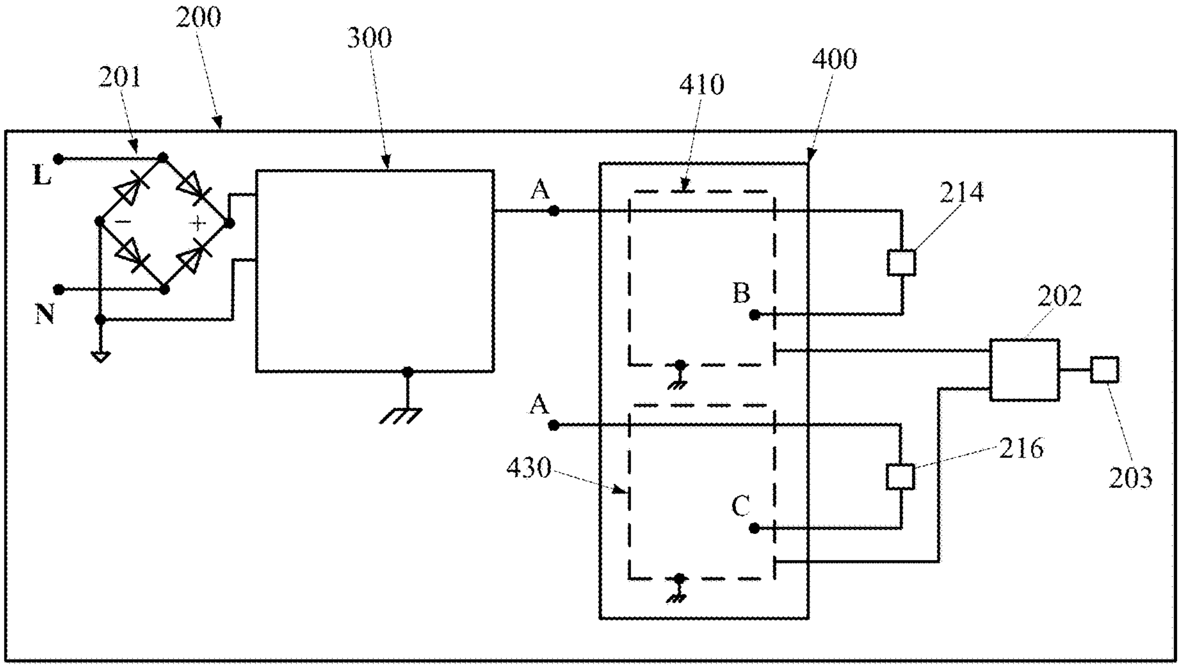
FIG. 3 is a third embodiment of an LED luminaire according to the present disclosure.

FIG. 3 is a third embodiment of an LED luminaire according to the present disclosure. In FIG. 3, the LED luminaire 200 is almost the same as the one in FIG. 1 except that the LED driving circuit 400 comprises a first driver 410 and a second driver 430 and the one or more LED arrays 214 and 216. The first driver 410 is configured to produce one set of driving current in response to one set of signal provided by the signal generating circuit 202 to drive the one or more LED arrays 214 whereas the second driver 430 is configured to produce a constant driving current in response to a signal provided by the signal generating circuit 202 to drive the one or more LED arrays 216. As mentioned above, the imperceptible flicker even above CFF sometimes cannot satisfy customers who have acute visions to see a tiny flicker. In that case, the LED luminaire 200 must include an option to further improve flicker imperceptibility. In FIG. 3, light emissions from the one or more LED arrays 216 are used to increase a background light in an illumination area, which consequently decreases a possibility of a light flicker on the one or more LED arrays 214 due to the one set of signal modulated to be detected with a reduced percent flicker.

Figure 4:
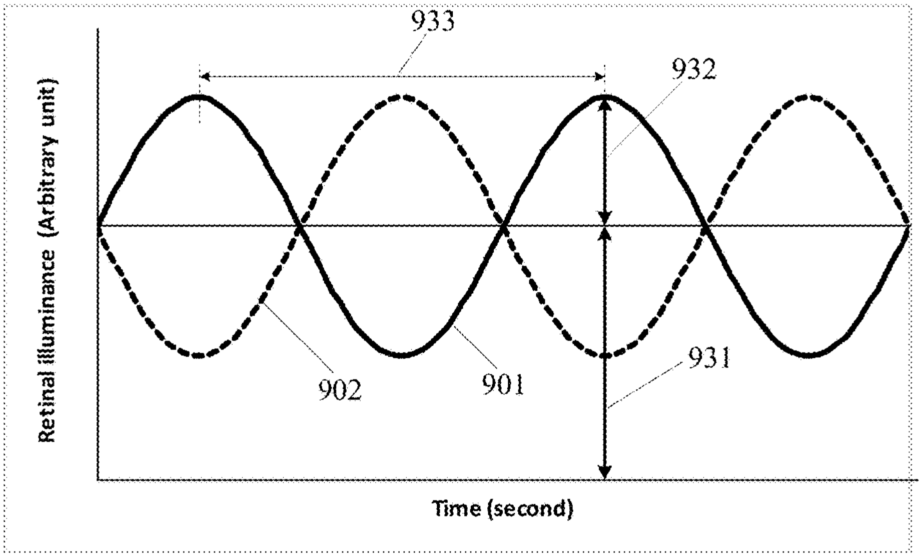
FIG. 4 is an example of waveforms of visual stimuli used in simulating a light flicker according to the present disclosure.

FIG. 4 is an example of waveforms of visual stimuli used in simulating a light flicker according to the present disclosure. In FIG. 3, two waveforms 901 and 902 represent two visual stimuli. Experimental results show that a flicker response linearly follows the visual stimuli. In FIG. 4, each of the waveforms can be expressed as $g(t)=E(1+m*\sin(\omega t+\varphi))$, where g(t) comprises a steady-state component, E (denoted as 931), providing a retinal illuminance E=const., t denoting time, ω denoting an angular frequency of a flicker input to the human's eye, a phase shift φ relative to a zero phase reference, and a sinusoidally modulated component with an amplitude corresponding to retinal illuminance mE (denoted as 932) with $0<m<1$. In FIG. 4, the waveform 901 has a period 933, which is $2\pi/\omega$, related to a temporal modulation frequency. The waveform 902 has a phase shift π (i.e., 180 degrees) relative to the waveform 901. There are seven factors that determine the ability to detect a flicker by a human's eye: 1) the temporal modulation frequency; 2) the amplitude or depth of the modulation (i.e., mE); 3) the average (or maximum) illumination intensity (i.e., E); 4) the wavelength (or wavelength range) of the illumination (this factor and the illumination intensity can be combined into a single factor for humans for which the sensitivities of rods and cones are known as a function of wavelength using the luminous flux function); 5) the position on the retina at which the stimulation occurs (due to the different distribution of photoreceptor types at different positions); 6) the degree of light or dark adaptation, i.e., the duration and intensity of previous exposure to background light, which affects both the intensity sensitivity and the time resolution of vision; 7) physiological factors such as age and fatigue. It is important to note that the phase shift φ may be associated with latency of a visual system of the human's eye. In practice, it is necessary to introduce the phase shift φ in addition to π (i.e., 180 degrees) to compensate a phase difference between the two stimuli in the visual system mediating brightness and chromatic perceptions, so as to reduce visual flickers.

Figure 5:
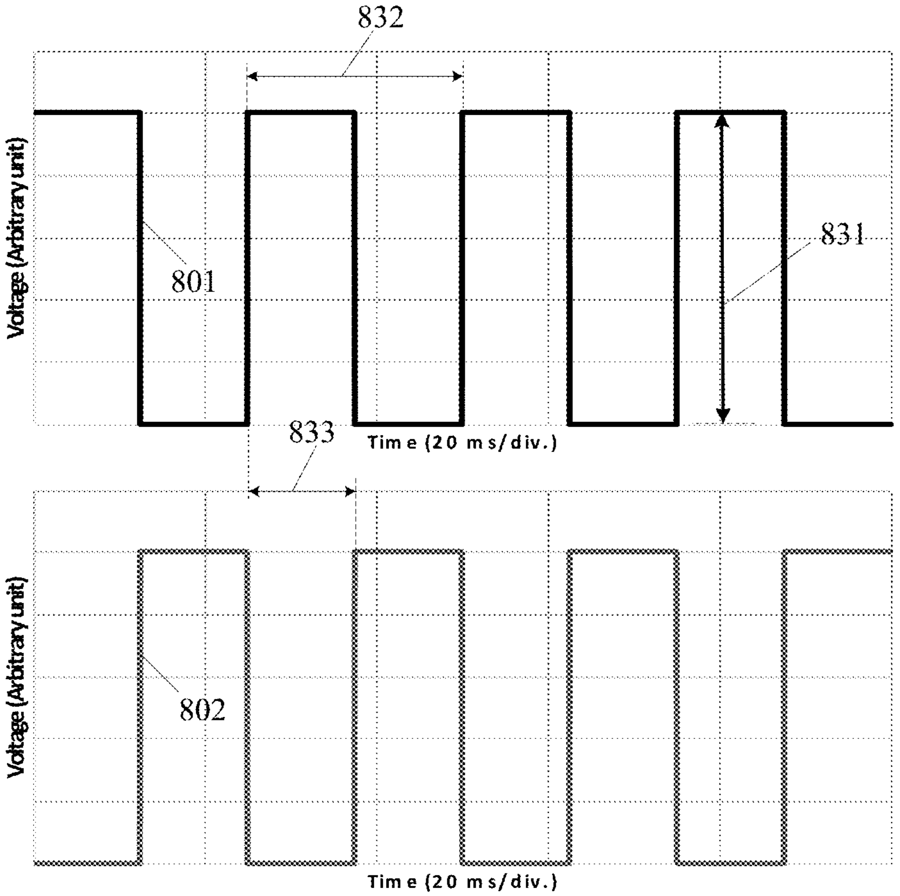
FIG. 5 is an example of two square waves used to drive LED arrays according to the present disclosure.

FIG. 5 is an example of two square waves used to drive LED arrays according to the present disclosure. In FIG. 5, a first square wave 801 and a second square wave 802 are used as two stroboscopic stimuli with 100% modulation depth, amplitude 831, and a period 832. The first square wave 801 and the second square wave 802 are 180 degrees out of phase (denoted as 833) from each other. When such two stroboscopic stimuli are modulated in the first type of LEDs and the second type of LEDs and mixed in a color domain, a resultant mixture becomes a third color and a reduced percent flicker (see FIG. 7). In FIG. 5, each of the first set of signal (i.e., the first square wave 801) and the second set of signal (i.e., the second square wave 802) comprises a series of pulses with a duty cycle of 50% and a predetermined period (i.e., the period 832). A reciprocal of the predetermined period is the predetermined temporal modulation frequency. The two sets of driving current comprise two modulation signals both associated with the predetermined period. Respective light emissions from the first type of LEDs and the second type of LEDs in response to the two sets of driving current comprise the predetermined period with the phase difference angle of nominal 180 degrees, same as the phase difference angle between the two modulation signals respectively applied on the first type of LEDs and the second type of LEDs.

Figure 6:
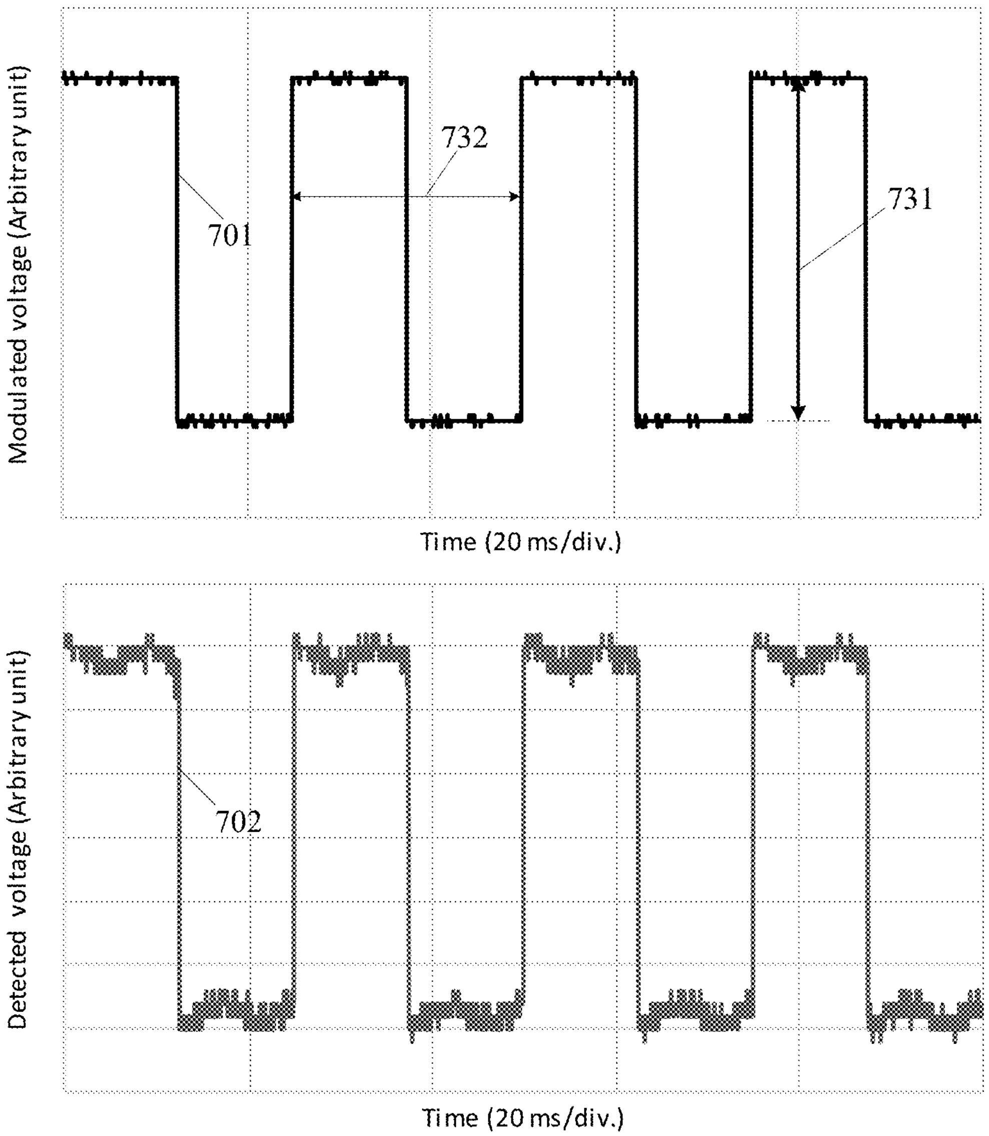
FIG. 6 is a visual flicker waveform relative to a reference visual stimulus according to the present disclosure.

FIG. 6 is a visual flicker waveform relative to a reference stimulus according to the present disclosure. In FIG. 6, a reference modulated stimulus waveform 701 and a detected flicker voltage waveform 702 when there is only one reference modulated stimulus 701 is present. The reference modulated stimulus waveform 701 comprises amplitude 731 and a temporal modulation period 732. As can be seen, the detected flicker voltage waveform 702 simply follows the reference modulated stimulus waveform 701, and both waveforms are in phase. A calculated percent flicker is as high as 70% due to the temporal modulation by the reference modulated stimulus 701.

Figure 7:
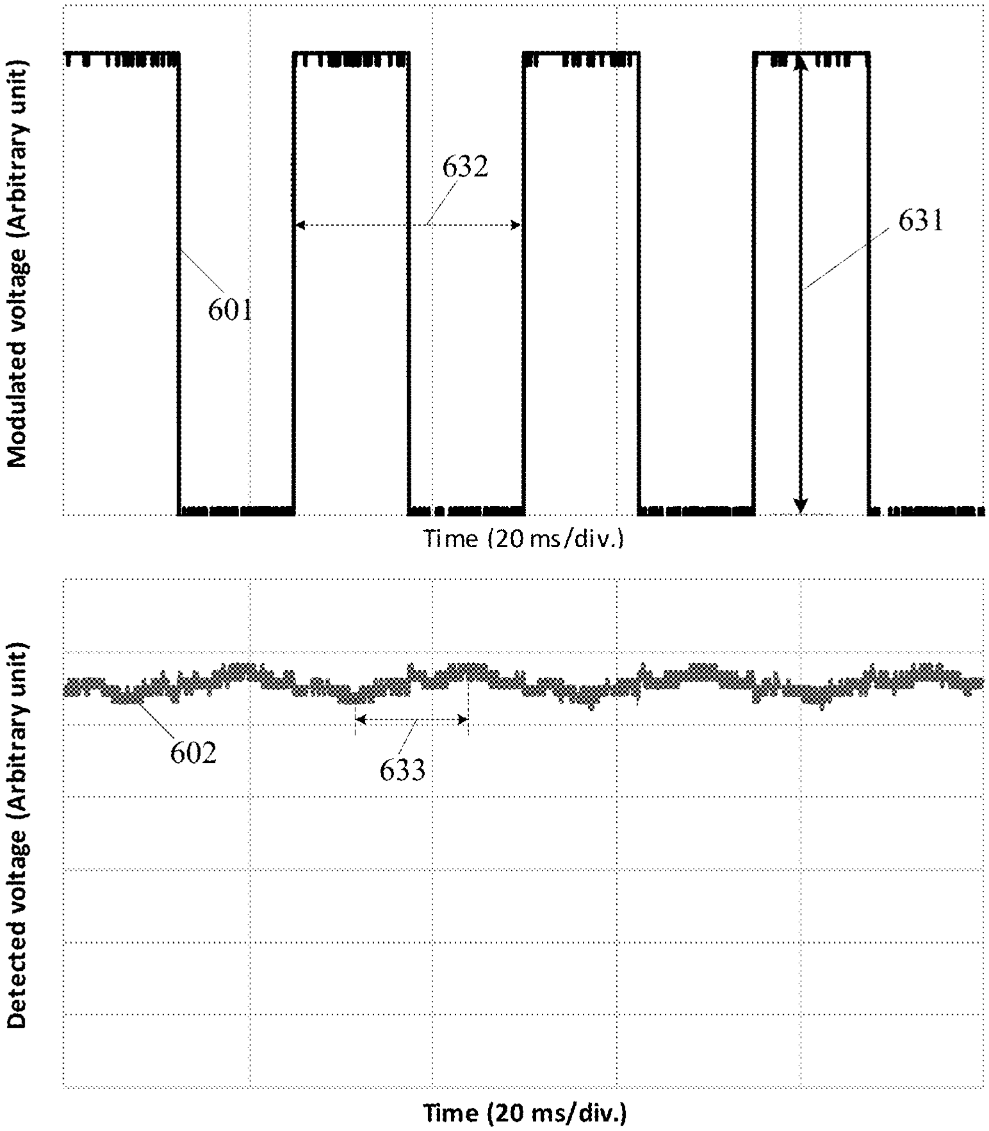
FIG. 7 is a visual flicker waveform relative to a reference stimulus with a reduced brightness flicker according to the present disclosure.

FIG. 7 is a visual flicker waveform relative to a reference stimulus with a reduced brightness flicker according to the present disclosure. In FIG. 7, a detected flicker voltage waveform 602 is 180 degrees out of phase with a reference modulated stimulus waveform 601 when the two reference modulated stimuli (as in FIG. 5) are present. The reference modulated stimulus waveform 601 comprises amplitude 631 and a temporal modulation period 632. As can be seen, the detected flicker voltage waveform 602 simply follows the reference modulated stimulus waveform 601 but with a phase shift 633 of 180 degrees. This is because the amplitude of the other modulated stimulus is larger than that of the reference modulated stimulus (i.e., the waveform 601). The detected flicker voltage waveform 602 shows a reduced brightness flicker relative to the detected flicker voltage waveform 702 in FIG. 6. A calculated percent flicker is as low as 5% due to a compensation effect of two complementary modulated stimuli.

Figure 8:
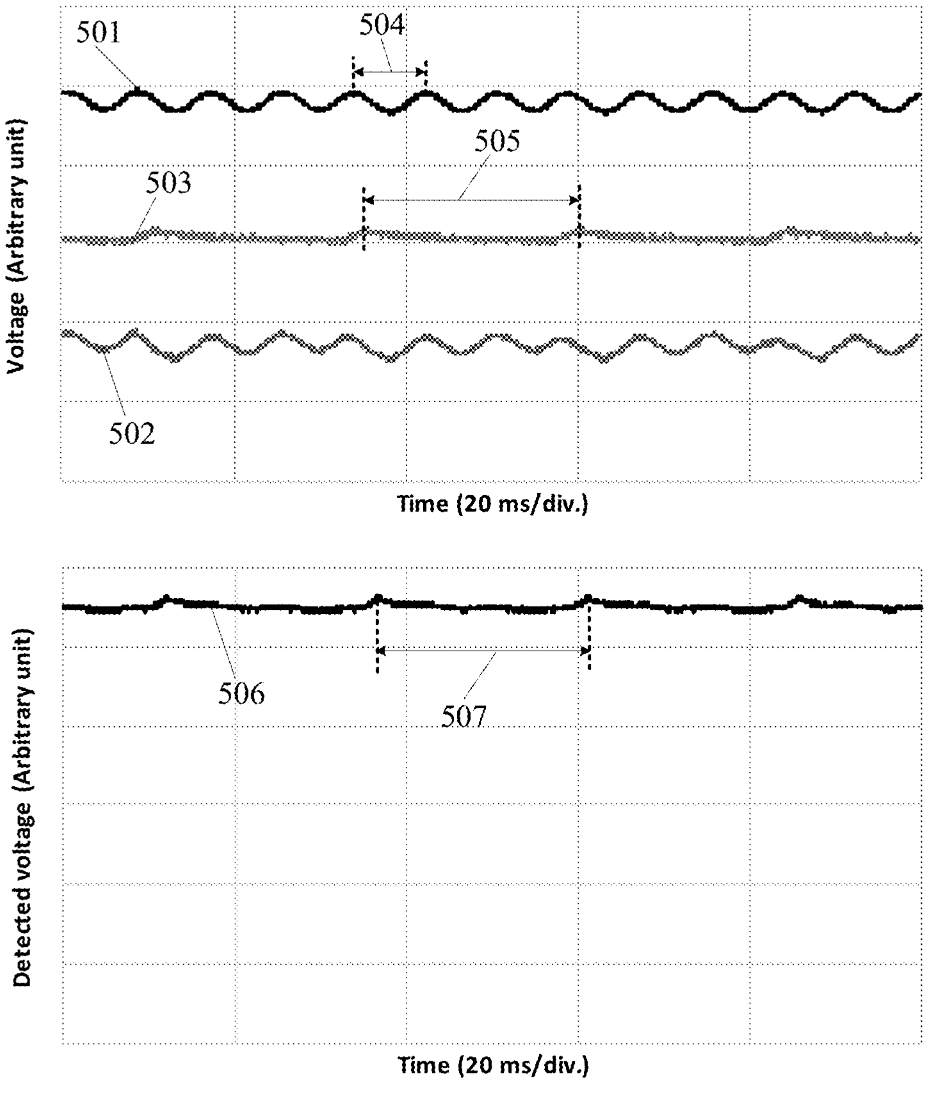
FIG. 8 is various voltage waveforms in a driver according to the present disclosure.

FIG. 8 is various voltage waveforms according to the present disclosure. In FIG. 8, a second DC voltage waveform 501 comprises a voltage ripple associated with the line voltage. A ripple period 504 is related to the line frequency, which is 8.33 milliseconds (corresponding to 120 Hz). An output voltage waveform 502 from the low-pass filter 413 (FIG. 1) comprises exactly the voltage ripple as in second DC voltage waveform 501. In FIG. 1, the third DC voltage is taken between the second DC voltage and the output voltage of the Low-pass filter 413. In FIG. 8, a third DC voltage waveform 503 shows that the ripple voltage has been removed, leaving with a relatively flat waveform and with a period 505 associated with the modulated stimulus. A calculated percent flicker in the third DC voltage waveform 503 is about 2.6%. This means that taking voltage difference of the second DC voltage and the output voltage from the low-pass filter as a driving voltage (i.e., the third DC voltage) leads to a reduced low-frequency current ripple. In FIG. 8, a light output emission from the one or more LED arrays is sampled and recorded in a plot of 506 with a little apparent flicker, where a period (i.e., time interval) 507 represents 8.33 milliseconds, same as the period 505. A flicker meter has been used to measure a percent flicker, which shows the percent flicker less than 4%. Since the luminance of the one or more LED arrays 214 responds instantaneously to the LED driving current, the reduced low-frequency current ripple causes the luminous output with a reduced low-frequency flicker.

Figure 9:
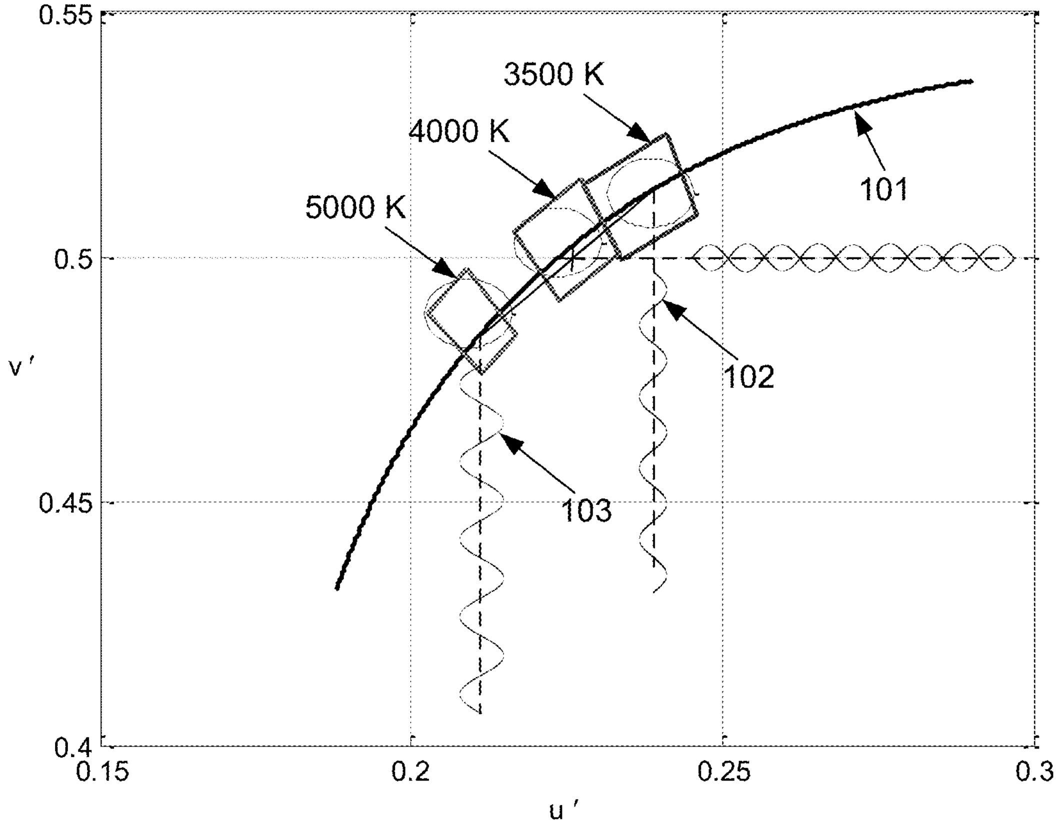
FIG. 9 is a first example of two types of LEDs with color coordinates plotted in (u', v') chromaticity diagram according to the present disclosure.

FIG. 9 is a first example of two types of LEDs with color coordinates plotted in (u', v') chromaticity diagram according to the present disclosure. In FIG. 9, a plot 101 is Planckian locus. As depicted in FIG. 1, the first type of LEDs and the second type of LEDs respectively emit a first white light at a nominal CCT of 3500 K and a second white light at a nominal CCT of 5000 K. The chromaticity of the first type of LEDs and the second type of LEDs falls within the corresponding 7-step chromaticity quadrangles as defined in ANSI/NEMA/ANSLG C78.377-2011. A resultant illumination from the first type of LEDs and the second type of LEDs exhibits a nominal CCT of 4000 K as a result of color mixing along a Planckian locus in color coordinates. A plot 102 and a plot 103 represent two complementary modulation signals are applied on the first type of LEDs and the second type of LEDs. The two complementary modulation signals in FIG. 9 may not be scaled. The resultant illumination from the first type of LEDs and the second type of LEDs individually comprises the modulation signal, which causes apparent flickers. But in combination, the resultant illumination exhibits a reduced flicker.

Figure 10:
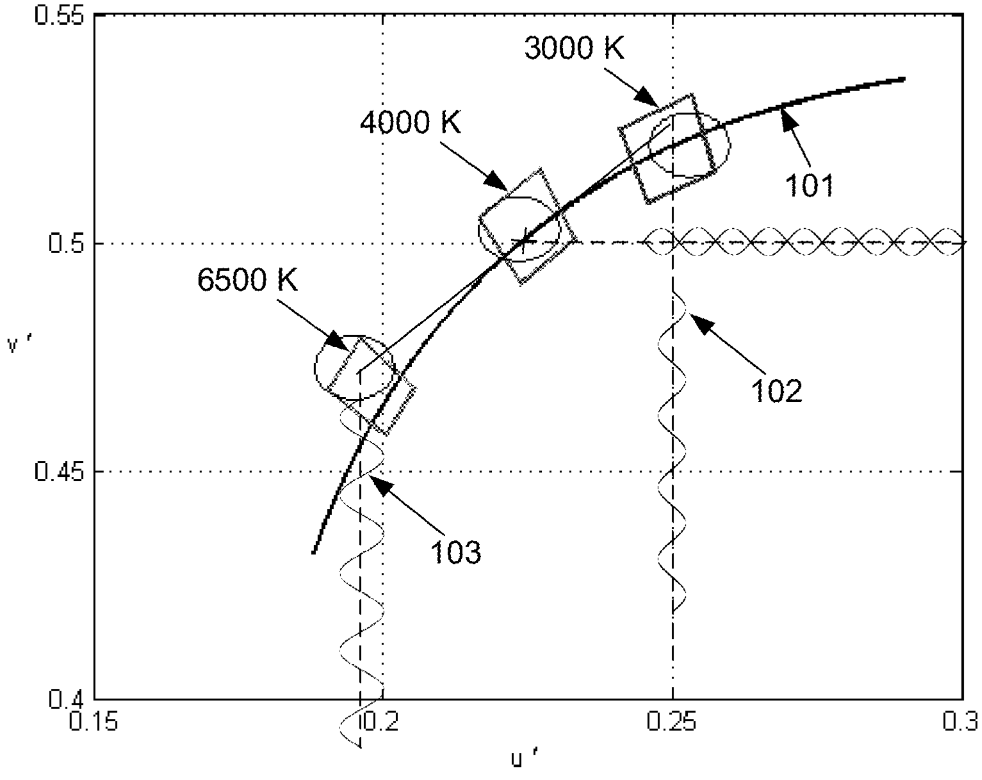
FIG. 10 is a second example of two types of LEDs with color coordinates plotted in (u', v') chromaticity diagram according to the present disclosure.

FIG. 10 is a second example of two types of LEDs with color coordinates plotted in (u', v') chromaticity diagram according to the present disclosure. In FIG. 10, a plot 101 is Planckian locus. As depicted in FIG. 1, the first type of LEDs and the second type of LEDs may respectively emit a first white light at a nominal CCT of 3000 K and a second white light at a nominal CCT of 6500 K. The chromaticity of the first type of LEDs and the second type of LEDs falls within the corresponding 7-step chromaticity quadrangles. A resultant illumination from the first type of LEDs and the second type of LEDs exhibits a nominal CCT of 4000 K as a result of color mixing along a Planckian locus in color coordinates. A plot 102 and a plot 103 represent two complementary modulation signals are applied on the first type of LEDs and the second type of LEDs. The two complementary modulation signals in FIG. 10 may not be scaled. The resultant illumination from the first type of LEDs and the second type of LEDs individually comprises the modulation signal, which causes apparent flickers. But in combination, the resultant illumination exhibits a reduced flicker.

Figure 11:
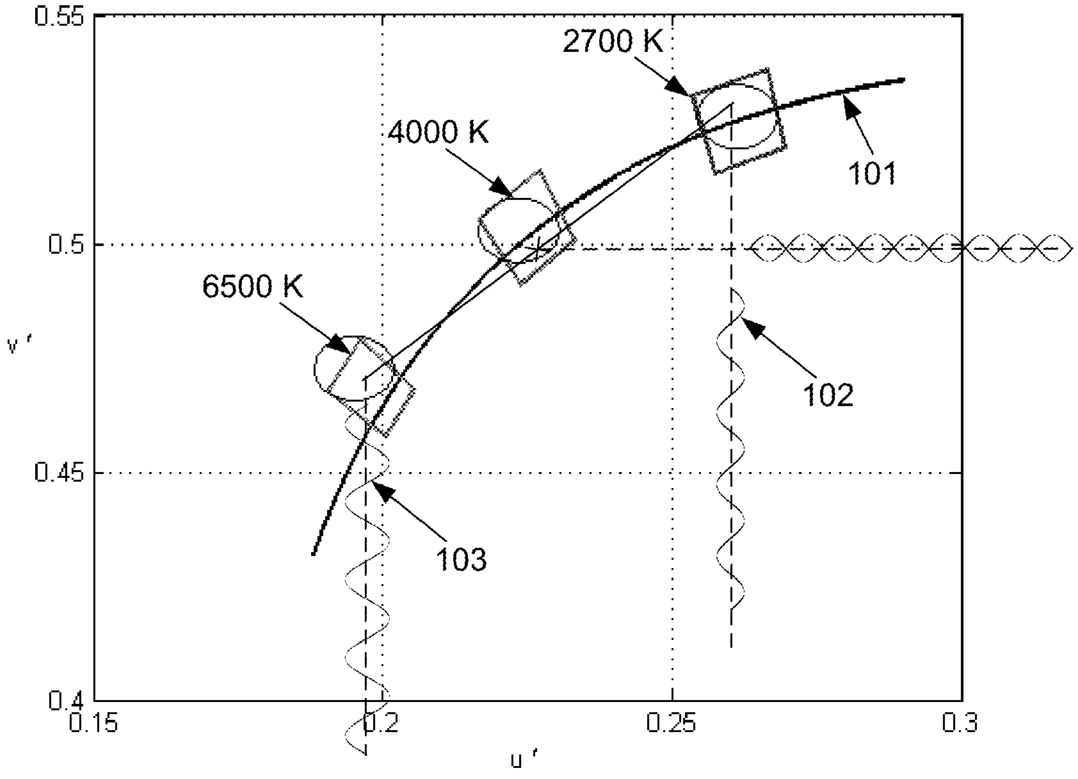
FIG. 11 is a third example of two types of LEDs with color coordinates plotted in (u', v') chromaticity diagram according to the present disclosure.

FIG. 11 is a third example of two types of LEDs with color coordinates plotted in (u', v') chromaticity diagram according to the present disclosure. In FIG. 11, a plot 101 is Planckian locus. As depicted in FIG. 1, the first type of LEDs and the second type of LEDs may respectively emit a first white light at a nominal CCT of 2700 K and a second white light at a nominal CCT of 6500 K. The chromaticity of the first type of LEDs and the second type of LEDs falls within the corresponding 7-step chromaticity quadrangles. A resultant illumination from the first type of LEDs and the second type of LEDs exhibits a nominal CCT of 4000 K as a result of color mixing along a Planckian locus in color coordinates. A plot 102 and a plot 103 represent two complementary modulation signals are applied on the first type of LEDs and the second type of LEDs. The two complementary modulation signals in FIG. 11 may not be scaled. The resultant illumination from the first type of LEDs and the second type of LEDs individually comprises the modulation signal, which causes apparent flickers. But in combination, the resultant illumination exhibits a reduced flicker.

Figure 12:
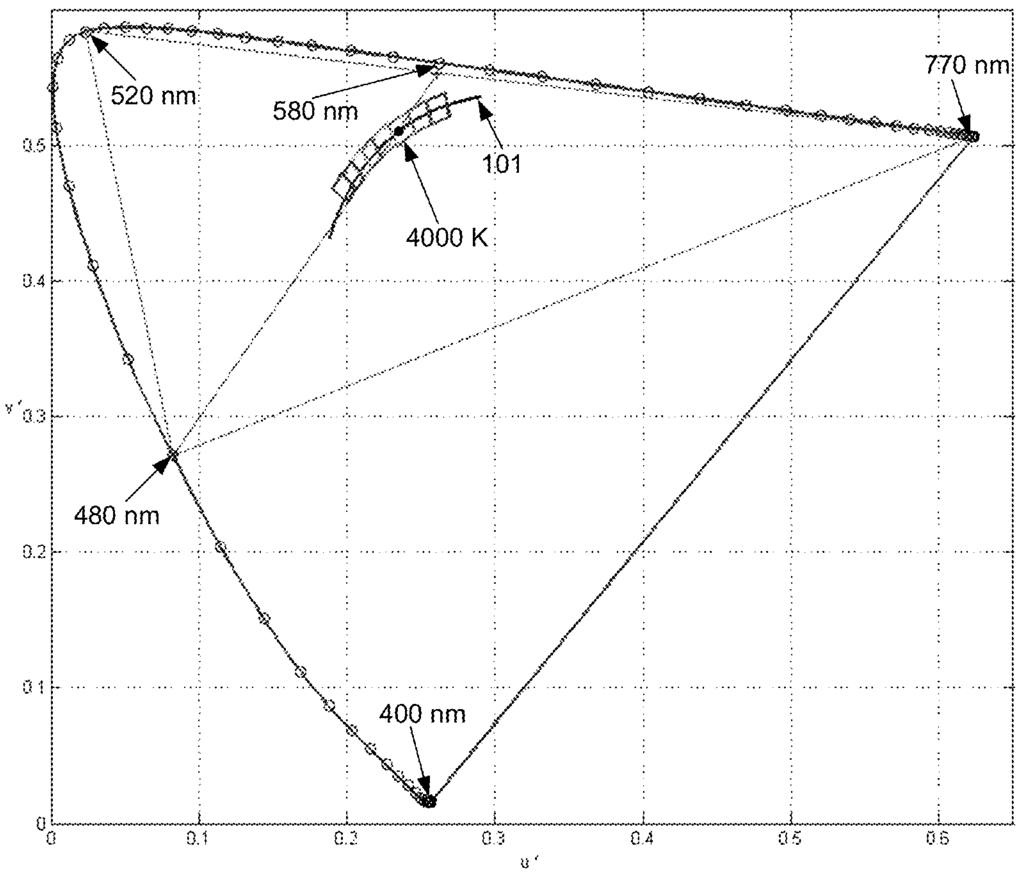
FIG. 12 is a fourth example of two types of LEDs with color coordinates plotted in (u', v') chromaticity diagram according to the present disclosure.

FIG. 12 is a fourth example of two types of with color coordinates plotted in (u', v') chromaticity diagram according to the present disclosure. In FIG. 12, a human's eye sensitivity gamut is plotted with a plot 101 as Planckian locus. The first type of LEDs comprise multiple LEDs saturated at red, saturated at green, and saturated at blue, whereas the second type of LEDs emit a white light at a nominal CCT of 4000 K. The saturated red, the saturated green, and saturated blue respectively falls at a wavelength of 770 nm, a wavelength of 520 nm, and a wavelength of 480 nm can be controlled to fall within chromaticity quadrangles at a nominal CCT of 4000 K as a result of color mixing of three primary colors, red, green, and blue in color coordinates. A resultant illumination from the first type of LEDs and the second type of LEDs exhibits a nominal CCT of 4000 K. The two complementary modulation signals (not shown for simplicity) are applied on the first type of LEDs and the second type of LEDs. The resultant illumination from the first type of LEDs and the second type of LEDs individually comprises the modulation signal, which causes apparent flickers. But in combination, the resultant illumination exhibits a reduced chromatic flicker, which has lower critical chromatic flicker frequency (CCFF) than CFF in general, as mentioned above. The CCFF is 28 Hz at 100% modulation for a particular retinal illuminance. The CCFF occurs only when the two modulation signals are 180 degrees out of phase. For a fixed modulation frequency, chromatic flicker is more difficult than brightness flicker to be seen by a normal person. The chromatic flicker may be generated by presenting two stimuli of different colors in a periodically alternating mode. This is one of cases according to present disclosure. At a particular temporal modulation frequency, the two stimuli of different colors will fuse to a single color as mixture of the two stimuli of different colors. In this case, the so called "chromatic flicker" disappears. The particular temporal modulation frequency is referred to as CCFF. In FIG. 12, the first type of LEDs may comprise multiple LEDs saturated at red and at green whereas the second type of LEDs may comprise LEDs saturated at blue. A resultant illumination from the first type of LEDs and the second type of LEDs exhibits a nominal CCT of 4000 K as a result of color mixing for the first type of LEDs and the second type of LEDs along a Planckian locus in color coordinates.

Figure 13:
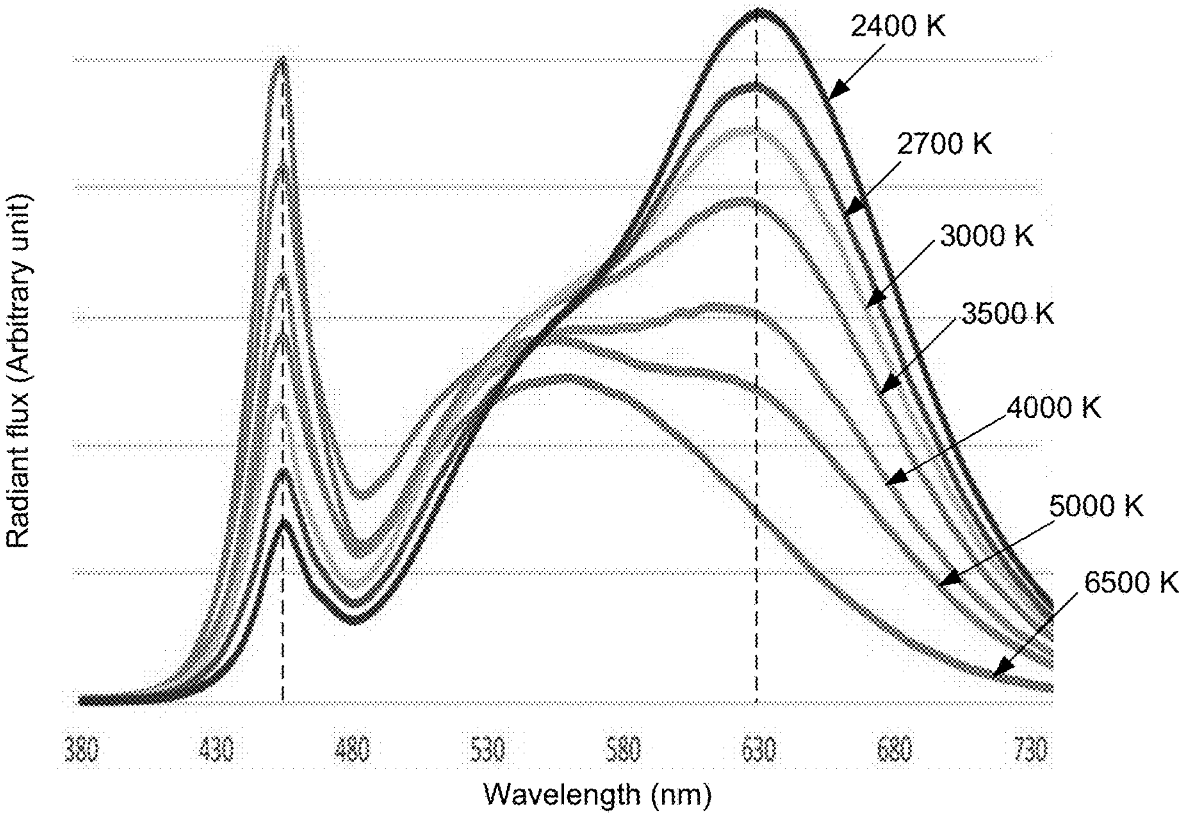
FIG. 13 is an example of various spectral power distributions according to the present disclosure.

FIG. 13 is an example of various spectral power distributions according to the present disclosure. In FIG. 13, the various spectral power distributions (SPDs) are of white light emitted by various white LEDs with CCTs at 2400 K, 2700 K, 3000 K, 3500 K, 4000K, 5000 K, and 6500 K. As can be seen, each of SPDs exhibits variations across the spectrum. The various SPDs show two peak values at approximately 450 nm (in the blue region of the visible spectrum) and in the approximately 525-630 nm range (in the green-yellow area of the visible spectrum), ensuring good color quality (i.e., Ra≥80 and $R_9$>0). As a rule, CFF is dependent on color difference whereas CCFF depends on chromaticity difference. The larger the differences, the lower CFF and CCFF. Therefore, by using these white LEDs, imperceptible flicker can be achieved at the modulation frequency of interest, such as 40 Hz or 65 Hz.

Whereas preferred embodiments of the present disclosure have been shown and described, it will be realized that alterations, modifications, and improvements may be made thereto without departing from the scope of the following claims. Another LED driving circuit with an output voltage and current modulated and embedded in an LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:

one or more LED arrays comprising a first type of LEDs and a second type of LEDs;

at least one full-wave rectifier configured to couple to alternate-current (AC) mains and convert a line voltage from the AC mains into a first direct-current (DC) voltage;

a switching circuit comprising a control device, a diode rectifier circuit, and a first electronic switch controlled by the control device and configured to modulate the first DC voltage into a variable DC voltage at a switching frequency;

a signal generating circuit comprising a phase shifter circuit and configured to produce a first set of signal and a second set of signal both at a predetermined temporal modulation frequency; and an LED driving circuit comprising two sets of drivers each comprising a low-pass filter circuit, the two sets of drivers configured to produce two sets of driving current, in response to the first set of signal and the second set of signal, to drive the one or more LED arrays, wherein:

the phase shifter circuit is configured to shift a first phase of the first set of signal into a second phase of the second set of signal;

the switching circuit is configured to convert the first DC voltage into a second DC voltage and to operate the two sets of drivers;

the two sets of drivers are further configured to respectively produce a third DC voltage and a fourth DC voltage each with a lower electric potential than the second DC voltage;

the low-pass filter circuit is configured to remove high frequency components higher than the predetermined temporal modulation frequency in either of the third DC voltage or the fourth DC voltage, resulting in an illumination from the first type of LEDs and the second type of LEDs with less visual discomfort to luminaire users; and the two sets of drivers respectively comprise a second electronic switch and a third electronic switch respectively configured to modulate the two sets of driving current, in response to the first set of signal and the second set of signal, to drive the one or more LED arrays.

2. The light-emitting diode (LED) luminaire of claim 1, wherein either of the first set of signal and the second set of signal comprises a modulation signal at the predetermined temporal modulation frequency with a phase difference angle of nominal 180 degrees between the first phase and the second phase.

3. The light-emitting diode (LED) luminaire of claim 2, wherein the third DC voltage, the fourth DC voltage, and the two sets of driving current in response to the first set of signal and the second set of signal are further configured to respectively drive the first type of LEDs and the second type of LEDs.

4. The light-emitting diode (LED) luminaire of claim 1, wherein the diode rectifier circuit provides a primary output port, wherein the low-pass filter circuit in either of the two sets of drivers provides a secondary output port, wherein the third DC voltage and the fourth DC voltage are respectively taken between the primary output port and the secondary output port in each of the two sets of drivers, thereby canceling out a common fluctuating AC component in the third DC voltage and the fourth DC voltage, and wherein the third DC voltage and the fourth DC voltage are respectively applied to the first type of LEDs and the second type of LEDs with reduced flickers, thereby reducing eyestrain of the luminaire users.

5. The light-emitting diode (LED) luminaire of claim 4, wherein each of the first set of signal and the second set of signal comprises square waves comprising a series of pulses with a duty cycle of 50% and a predetermined period, wherein the two sets of driving current comprise two modulation signals both associated with the predetermined period, and wherein respective light emissions from the first type of LEDs and the second type of LEDs in response to the two sets of driving current comprise the predetermined period with a phase difference angle of nominal 180 degrees, same as the phase difference angle between the two modulation signals respectively applied on the first type of LEDs and the second type of LEDs.

6. The light-emitting diode (LED) luminaire of claim 5, wherein overall light emissions in combination from the first type of LEDs and the second type of LEDs comprise a reduced percent flicker due to the two modulation signals.

7. The light-emitting diode (LED) luminaire of claim 4, wherein the first type of LEDs and the second type of LEDs respectively emit a first white light at a nominal correlated color temperature (CCT) of 3500 K and a second white light at a nominal CCT of 5000 K.

8. The light-emitting diode (LED) luminaire of claim 7, wherein a resultant illumination from the first type of LEDs and the second type of LEDs exhibits a nominal CCT of 4000 K as a result of color mixing along a Planckian locus in color coordinates, and wherein the overall light emissions in combination comprise a reduced percent flicker due to the two modulation signals, thereby reducing eyestrain of the luminaire users.

9. The light-emitting diode (LED) luminaire of claim 4, wherein the first type of LEDs and the second type of LEDs respectively emit a first white light at a nominal correlated color temperature (CCT) of 3000 K and a second white light at a nominal CCT of 6500 K.

10. The light-emitting diode (LED) luminaire of claim 9, wherein a resultant illumination from the first type of LEDs and the second type of LEDs exhibits a nominal CCT of 4000 K as a result of color mixing along a Planckian locus in color coordinates, and wherein the overall light emissions in combination comprise a reduced percent flicker due to the two modulation signals, thereby reducing eyestrain of the luminaire users.

11. The light-emitting diode (LED) luminaire of claim 4, wherein the first type of LEDs and the second type of LEDs respectively emit a first white light at a nominal correlated color temperature (CCT) of 2700 K and a second white light at a nominal CCT of 6500 K.

12. The light-emitting diode (LED) luminaire of claim 11, wherein a resultant illumination from the first type of LEDs and the second type of LEDs exhibits a nominal CCT of 4000 K as a result of color mixing along a Planckian locus in color coordinates, and wherein the overall light emissions in combination comprise a reduced percent flicker due to the two modulation signals, thereby reducing eyestrain of the luminaire users.

13. The light-emitting diode (LED) luminaire of claim 1, wherein the predetermined temporal modulation frequency is a nominal 40 Hz.

14. The light-emitting diode (LED) luminaire of claim 1, wherein the signal generating circuit further comprises a Bluetooth system-on-chip (SOC) circuit.

15. The light-emitting diode (LED) luminaire of claim 1, wherein the one or more LED arrays further comprise a third type of LEDs, wherein the first set of signal and the second set of signal are configured to modulate the two sets of driving current to drive the first type of LEDs and the second type of LEDs, and wherein the third type of LEDs are configured to be driven with a constant current, thereby increasing a background light in an illumination area, consequently decreasing a possibility of light flickers on the first type of LEDs and the second type of LEDs to be detected with a reduced percent flicker.

16. The light-emitting diode (LED) luminaire of claim 15, wherein the third type of LEDs emit a white light at a nominal correlated color temperature (CCT) of 4000 K, and wherein the overall light emissions in combination comprise a reduced percent flicker due to the two modulation signals, thereby reducing eyestrain of the luminaire users.

17. The light-emitting diode (LED) luminaire of claim 3, wherein the first type of LEDs comprise multiple LEDs saturated at red, saturated at green, and saturated at blue, and wherein the second type of LEDs emit a white light at a nominal correlated color temperature (CCT) of 4000 K, and wherein a resultant illumination from the first type of LEDs exhibits a nominal CCT of 4000 K as a result of color mixing for the multiple LEDs along a Planckian locus in color coordinates, and wherein the overall light emissions in combination comprise a reduced percent flicker due to the two modulation signals, thereby reducing eyestrain of the luminaire users.

18. The light-emitting diode (LED) luminaire of claim 3, wherein the first type of LEDs comprise multiple LEDs saturated at red and at green, wherein the second type of LEDs comprise LEDs saturated at blue, and wherein a resultant illumination from the first type of LEDs and the second type of LEDs exhibits a nominal correlated color temperature (CCT) of 4000 K as a result of color mixing for the first type of LEDs and the second type of LEDs along a Planckian locus in color coordinates, and wherein the overall light emissions in combination comprise a reduced percent flicker due to the two modulation signals, thereby reducing eyestrain of the luminaire users.

19. A light-emitting diode (LED) luminaire, comprising:

one or more LED arrays comprising a first portion of LEDs and a second portion of LEDs;

at least one full-wave rectifier configured to couple to alternate-current (AC) mains and convert a line voltage from the AC mains into a first direct-current (DC) voltage;

a switching circuit comprising a control device, a diode rectifier circuit, and a first electronic switch controlled by the control device and configured to modulate the first DC voltage into a variable DC voltage at a switching frequency;

a signal generating circuit configured to produce a modulation signal at a predetermined temporal modulation frequency; and an LED driving circuit comprising at least one driver comprising at least one low-pass filter circuit, the at least one driver configured to produce at least one set of driving current, in response to the modulation signal, to drive the one or more LED arrays, wherein:

the switching circuit is configured to convert the first DC voltage into a second DC voltage and to operate the at least one driver;

the at least one driver is further configured to produce a third DC voltage with a lower electric potential than the second DC voltage;

the low-pass filter circuit is configured to remove high frequency components higher than the predetermined temporal modulation frequency in the third DC voltage, resulting in an illumination from the first portion of LEDs and the second portion of LEDs with less visual discomfort to luminaire users; and the at least one driver further comprises a second electronic switch configured to modulate the at least one set of driving current, in response to the modulation signal, to drive the one or more LED arrays.

20. The light-emitting diode (LED) luminaire of claim 19, wherein the modulation signal is configured to modulate the at least one set of driving current to drive the first portion of LEDs, and wherein the second portion of LEDs are configured to be driven with a constant current, thereby increasing a background light in an illumination area, consequently decreasing a possibility of light flickers on the first portion of LEDs to be detected with a reduced percent flicker.

21. The light-emitting diode (LED) luminaire of claim 19, wherein the predetermined temporal modulation frequency is a nominal 65 Hz.

* * * * *